United States Patent
Godlieb et al.

(10) Patent No.: US 11,116,303 B2
(45) Date of Patent: Sep. 14, 2021

(54) DISPLAYING A GUIDANCE INDICATOR TO A USER

(71) Applicant: KONINKLIJKE PHILIPS N.V., Eindhoven (NL)

(72) Inventors: Robert Godlieb, Drachten (NL); Matthijs Platje, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 21 days.

(21) Appl. No.: 16/466,480

(22) PCT Filed: Dec. 6, 2017

(86) PCT No.: PCT/EP2017/081611
§ 371 (c)(1),
(2) Date: Jun. 4, 2019

(87) PCT Pub. No.: WO2018/104356
PCT Pub. Date: Jun. 14, 2018

(65) Prior Publication Data
US 2020/0069034 A1 Mar. 5, 2020

(30) Foreign Application Priority Data
Dec. 6, 2016 (EP) .................................... 16202530

(51) Int. Cl.
*A45D 44/00* (2006.01)
*G06T 7/73* (2017.01)
(Continued)

(52) U.S. Cl.
CPC ........... *A45D 44/005* (2013.01); *A45D 27/42* (2013.01); *A45D 42/08* (2013.01); *G06T 7/73* (2017.01);
(Continued)

(58) Field of Classification Search
CPC ....................................................... G06T 7/74
(Continued)

(56) References Cited

U.S. PATENT DOCUMENTS 8,077,931 B1* 12/2011 Chatman .............. G06T 7/0012
382/118
9,442,564 B1* 9/2016 Dillon ..................... G06F 3/017
(Continued)

FOREIGN PATENT DOCUMENTS

| JP | 2008015942 | 1/2008 |
| WO | 2013011380 | 1/2013 |
| WO | 2016054164 | 4/2016 |

OTHER PUBLICATIONS

Mercier-Ganady, et al: "The Mind-Mirror: See your brain in action in your head using EEG and augmented reality", 2014 IEEE Virtual Reality (VR), IEEE, Mar. 29, 2014.
(Continued)

*Primary Examiner* — Javid A Amini

(57) ABSTRACT

According to an aspect, there is provided a method of displaying a guidance indicator to a user. The method comprises receiving a series of images of a head of a user; determining, from each image of the series of images, information relating to the position of the head of the user; and displaying to the user, on a display screen, a guidance indicator associated with a representation of the head of the user only if each of one or more defined conditions regarding the position of the head is met. According to other aspects, an apparatus is also provided.

18 Claims, 7 Drawing Sheets

(51) Int. Cl.
    *A45D 27/42*     (2006.01)
    *A45D 42/08*     (2006.01)
    *G06T 11/00*     (2006.01)
    *B26B 19/38*     (2006.01)

(52) U.S. Cl.
    CPC ........ *G06T 11/00* (2013.01); *A45D 2044/007* (2013.01); *B26B 19/388* (2013.01); *G06T 2207/30201* (2013.01)

(58) Field of Classification Search
    USPC .......................................................... 345/633
    See application file for complete search history.

(56) References Cited

U.S. PATENT DOCUMENTS

| | | | |
|---|---|---|---|
| 9,996,981 B1* | 6/2018 | Tran | G06K 9/4671 |
| 2009/0066803 A1 | 3/2009 | Miyata | |
| 2012/0223956 A1* | 9/2012 | Saito | G06F 3/0481 |
| | | | 345/582 |
| 2014/0354676 A1 | 12/2014 | Blanc | |
| 2015/0248581 A1* | 9/2015 | Gouda | G06T 19/006 |
| | | | 345/633 |
| 2015/0296133 A1 | 10/2015 | Kodama | |
| 2015/0356661 A1* | 12/2015 | Rousay | G06Q 30/0631 |
| | | | 705/26.7 |
| 2016/0042557 A1* | 2/2016 | Lin | G06T 7/73 |
| | | | 345/426 |
| 2016/0125227 A1* | 5/2016 | Soare | G06K 9/00281 |
| | | | 382/118 |
| 2017/0069052 A1* | 3/2017 | Li | H04N 13/271 |
| 2017/0193283 A1* | 7/2017 | Li | G06K 9/00255 |
| 2018/0137663 A1* | 5/2018 | Rodriguez | A45D 44/005 |

OTHER PUBLICATIONS

Kitanovski et al: "Augmented reality mirror for virtual facial alterations", Image Processing (ICIP), 2011 18TH IEEE International Conference on, IEEE, Sep. 11, 2011.
International Search Report and Written Opinion dated Feb. 28, 2018 for Application No. PCT/EP2017/081611 filed Dec. 6, 2017.
International Preliminary Report on Patentability dated Mar. 1, 2019 for Application No. PCT/EP2017/081611 filed Dec. 6, 2017.

* cited by examiner

DISPLAYING A GUIDANCE INDICATOR TO A USER

CROSS REFERENCE TO RELATED APPLICATIONS

This application is the U.S. National Phase application under 35 U.S.C. § 371 of International Patent Application No. PCT/EP2017/081611 filed Dec. 6, 2018, published as WO 2018/104356 on Jun. 14, 2018, which claims the benefit of European Patent Application Number 16202530.8 filed on Dec. 6, 2016. These application are hereby incorporated by reference herein.

FIELD OF THE INVENTION

The invention relates to providing guidance to a user and, more particularly, to displaying a guidance indicator to a user if particular conditions are met. A method and an apparatus are disclosed.

BACKGROUND OF THE INVENTION

When performing a personal care activity, such as applying make-up, performing a skin care activity, shaving or hair trimming, a user may use a smart mirror having a camera or an electronic device having a camera and an associated display screen, such as a tablet computer or smart phone, to provide guidance and/or feedback regarding the activity. For example, an application running on a tablet computer may be used to provide guidance to a user when shaving or trimming a particular style into the user's facial hair. The guidance may include, for example, the display of a guidance line on an image of the user, which the user can use to guide a shaving device to achieve a desired look.

In some scenarios, the guidance provided to the user may take the form of an image, for example an image of a desired facial hair design, which is superimposed or otherwise displayed over a representation of the user (e.g. an image captured by a camera, or a reflection in a smart mirror).

SUMMARY OF THE INVENTION

The display of a guidance line or a guidance image over an image or reflection of a user may obscure part of the user's face, such that the user is unable to see himself or herself clearly which, in some cases, may inhibit the performance of the personal care activity. In other cases, it may be desirable to display the guidance line or image while the personal care activity is being performed.

Therefore, there exists a need for an improved method for displaying a guidance indicator to a user, which can be selectively displayed and removed from view appropriately.

According to a first aspect, there is provided a method of displaying a guidance indicator to a user. The method comprises receiving a series of images of a head of a user; determining, from each image of the series of images, information relating to the position of the head of the user; and displaying to the user, on a display screen, a guidance indicator associated with a representation of the head of the user only if each of one or more defined conditions regarding the position of the head is met; wherein the defined conditions regarding the position of the head comprise one or more of the following: i) the information relating to the position of the head indicates that the position of the head can be determined to a defined threshold level of accuracy; ii) the information relating to the position of the head indicates that a change in the position of the head over a defined period is less than a defined threshold; and iii) the information relating to the position of the head indicates that an orientation of the head relative to the display screen is within a defined angular range.

By displaying the guidance indicator only when all of the defined conditions are met, the user is provided with an indication that he or she is in a suitable position relative to the display, such that the apparatus can confidently determine his or her position and orientation. Furthermore, while the user is performing a personal care activity (e.g. holding a hair cutting device up to their face), it may be undesirable to have the guidance indicator displayed as doing so may obscure the view of their representation. Therefore, not displaying the guidance indicator in such a scenario (because the position of the user's head cannot be determined accurately) may assist the user's ability to perform the personal care activity.

The position of the head may be considered to be determined to a defined threshold level of accuracy when a confidence in the position of the head, or a confidence in positions of facial features of the head are above a defined confidence level.

The defined threshold of the change in the position of the head over the defined period may comprise a change of less than ten percent of a width or a height of the images. In some embodiments, the defined threshold may comprise a change of less than six percent of a width or a height of the images. The defined period may, in some embodiments, comprise a defined time period (e.g. 0.5 seconds) while, in other embodiments, the defined period may comprise a period between capturing a first image and a second image in the series of images. Thus, the change in the position of the head may be measured between a first image and a second image in the series of images.

In some embodiments, the defined angular range comprises fifteen degrees from a normal to the display screen. In other embodiments, the defined angular range may comprise ten or twenty degrees either side of a normal to the display screen.

The series of images may, in some embodiments, be received via a camera associated with the display screen.

The guidance indicator may comprise at least one of: a line, text or an image for assisting the user with a personal care activity. The guidance indicator may overlay a representation of the user.

In some embodiments, displaying the guidance indicator may comprise causing the gradual appearance of the guidance indicator when the information relating to the position of the head indicates that all of the defined conditions are met. In this way, the user may be able to determine when he or she is approaching a position/orientation in which the position of their head can be confidently known.

A degree of visibility of the guidance indicator may vary as a function of the closeness of the position of the head to meeting the defined conditions. Thus, as the user moves towards or away from a position in which all the conditions are met, the user can tell easily and instinctively how he or she needs to position their head in order for the guidance indicator to be displayed.

According to some embodiments, the method may further comprise while the guidance indicator is being displayed on the display screen, causing the guidance indicator to gradually disappear if the information relating to the position of the head indicates that any one of the defined conditions is not met. As the user moves into a position which causes the guidance indicator to disappear, he or she can instinctively learn how their position needs to change in order for the guidance indicator to reappear fully.

Visibility of the guidance indicator may decrease as a function of a level of deviation of the position of the head from the defined conditions.

In some embodiments, the guidance indicator may be displayed to the user only if all of the defined conditions regarding the position of the head are met while, in other embodiments, the guidance indicator may be displayed to the user when a subset of the defined conditions are met.

According to a second aspect, there is provided an apparatus for providing guidance to a user, the apparatus comprising an imaging unit for receiving a series of images of a head of a user; a processing unit for determining, from each image of the series of images, information relating to the position of the head of the user; and a display screen; wherein the processing unit is configured to display, on the display screen, a guidance indicator associated with a representation of the head of the user only if each of one or more defined conditions regarding the position of the head is met; wherein the defined conditions regarding the position of the head comprise one or more of the following: i) the information relating to the position of the head indicates that the position of the head can be determined to a defined threshold level of accuracy; ii) the information relating to the position of the head indicates that a change in the position of the head over a defined period is less than a defined threshold; and iii) the information relating to the position of the head indicates that an orientation of the head relative to the display screen is within a defined angular range. In some embodiments, the processing unit may determine whether or not the conditions are met based on the information relating to the position of the head of the user.

In some embodiments, the processing unit may display the guidance indicator to the user only if all of the defined conditions regarding the position of the head are met while, in other embodiments, the processing unit may display the guidance indicator to the user when a subset of the defined conditions are met.

The apparatus may further comprise a camera for capturing the series of images of the head of the user.

In some embodiments, the apparatus may comprise a storage medium for storing at least one of: the received series of images; and the determined information relating to the position of the head of the user.

The apparatus may comprise one of: a smart TV, a smart mirror, a smart phone, a tablet computer, a laptop computer and a desktop computer.

These and other embodiments of the invention will become apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Amongst other purposes, the invention may, in some examples, be used to improve the display of a guidance indicator to a user, for example while the user looking at real time video (image stream) or reflection of himself or herself. For example, the invention may be implemented when performing personal care activities including, but not limited to make-up application, make-up removal, skin care, hair care, oral care and hair removal activities, such as shaving, epilating and trimming.

When performing a personal care activity, such as shaving facial hair, a user may use a guidance system or apparatus to provide guidance. Such an apparatus may include a camera associated with or coupled to a computing device, such as a smart mirror or a tablet computer. As a user performs the shaving activity in front of the camera, the apparatus may provide guidance to the user, for example in the form of a guidance indicator to be displayed on a display screen associated with the device (for example, on the screen of a smart mirror or on the display screen of the computing device). The guidance indicator may include a line, text, an image or a series of dots indicating, for example, areas of the user that should be shaved and areas that should not be shaved. In some examples, the guidance indicator may include one or more lines for indicating a level to which a user is to shave facial hair (e.g. sideburns) in order to achieve a desired, and symmetrical, look. In other embodiments, text may be displayed to communicate a message to the user.

In such a guidance system, image data representing the user (or a portion of the user) is received via the camera in the form of a series of images, and the image data is processed using processing apparatus associated with the system. A guidance indicator may then be generated and displayed along with or superimposed over an image of the user. In order for the guidance system to provide accurate guidance to the user, the camera needs to be able to image the user so that the position of the portion of the user to be treated (e.g. the user's head) can be determined.

Figure 1:
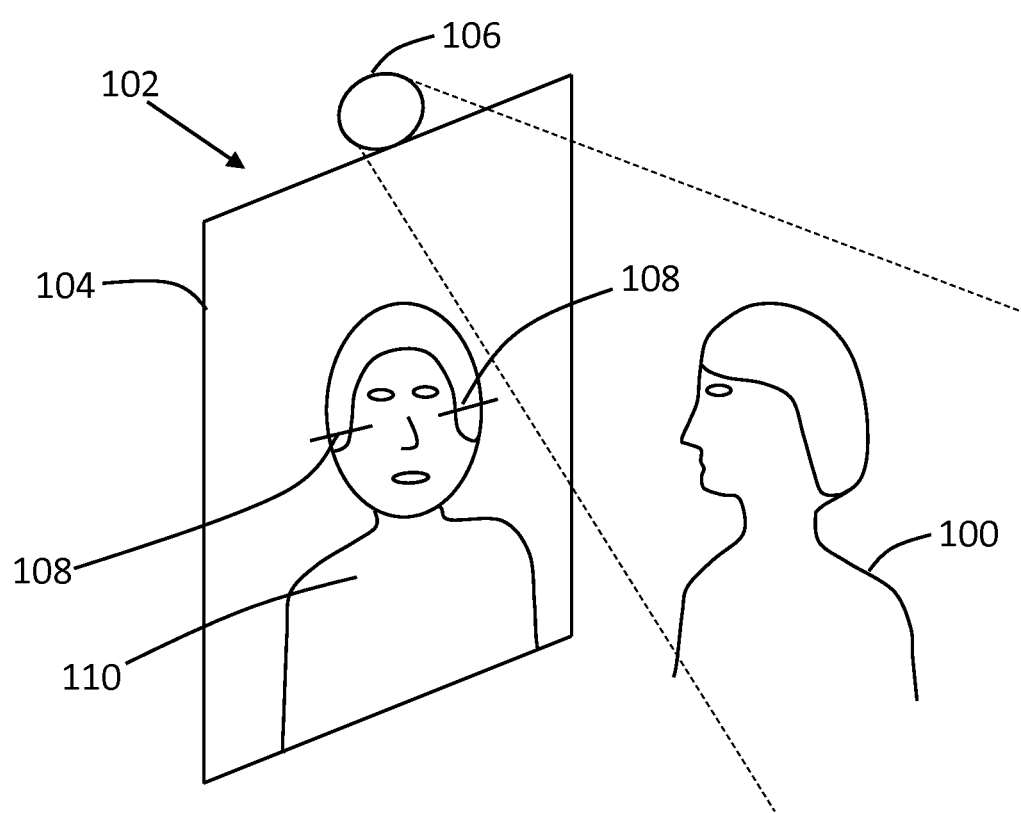
FIG. 1 is an illustration of a user performing a personal care activity using a smart mirror.

Referring to the drawings, FIG. 1 is an illustration showing a user 100 performing a personal care activity in front of an apparatus 102. The apparatus 102 is, in this example, a smart mirror which has a display 104 and a camera 106. The apparatus 102 may also include, or be connected to, a processing apparatus (not shown) for controlling the display 104 and/or the camera 106, and for processing information received by the camera and information to be present on the display. Dashed lines indicate an example field of view of the camera 106. The display 104 includes a mirrored portion to allow a user to view their reflection, and a display portion or screen, behind or built into the mirrored portion, which can be used to present information, such as images or text, to the user 100. The display 104 may, in some embodiments, be used to display information to the user such as news articles, weather information, calendar entries and the like. In the examples disclosed herein, however, the display 104 is also configured to display a guidance indicator 108 for assisting the user 100 performing a personal care activity.

Figure 2A:
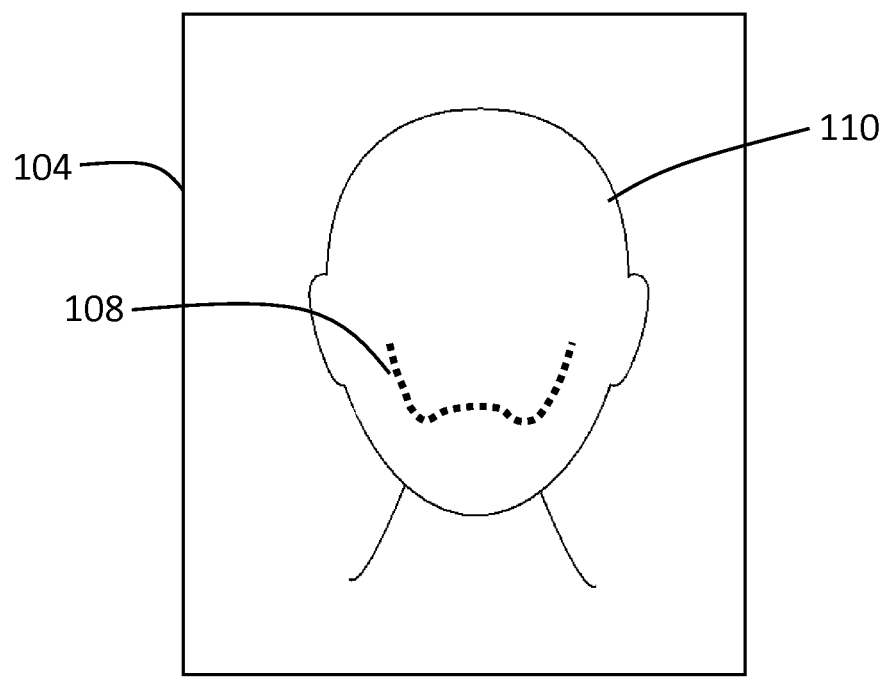
FIG. 2 is an illustration of an example of guidance indicators.
Figure 2B:
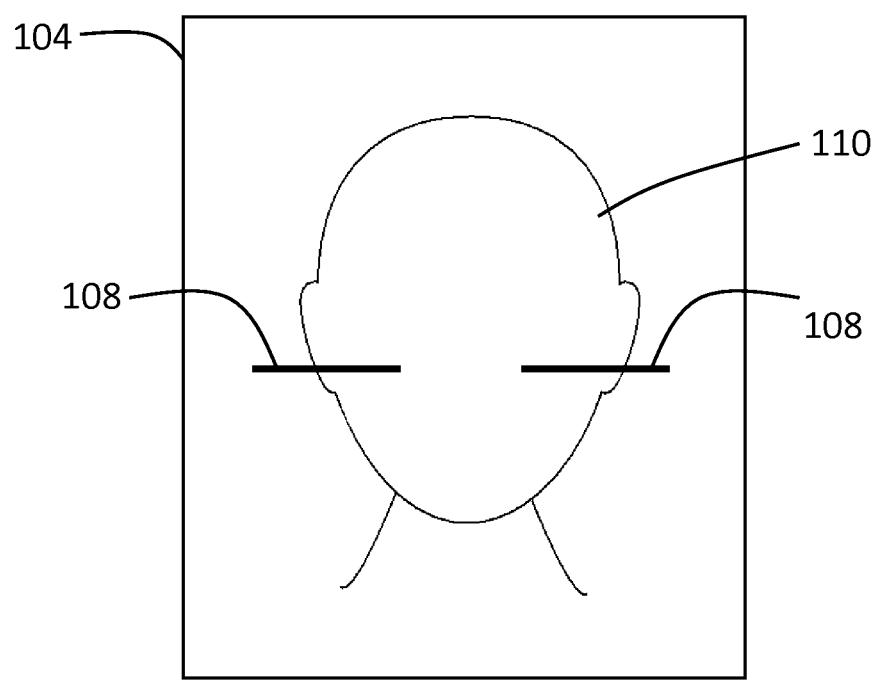

Examples of guidance indicators 108 that might be displayed by the apparatus 102 are shown in FIG. 2. As noted above, the guidance indicator 108 may, in some examples, include an image or a mask as shown in FIG. 2A. The image or mask may be projected or superimposed over the reflection of the user 100 so that the user is able to see the intended outcome of the activity. The user 100 may also use the projected image or mask to show the limits of where to perform the personal care activity. For example, when shaving or trimming facial hair, the user may use the image to show where to shave the hair to achieve the desired facial hair style. In other examples, as shown in FIG. 2B, the guidance indicator 108 may include one or more lines (as also shown in FIG. 1) for indicating where to shave or trim facial hair, such as sideburns, for achieving a symmetrical facial hair style.

In other examples, the apparatus 102 may comprise, or form a part of, a computing device, such as a smart TV, a smart phone, a tablet computer or a laptop or desktop computer. In some examples, the display 104 may comprise a display screen of the computing device, and the camera 106 may be a camera built into or connected to the device. The display 104 may display an image or live video stream of the user 100 rather than a reflection of the user. The image or series of images may be captured by the camera 106.

In general, the display 104 can be considered to display a representation 110 of the user 100, which may be a reflection or a captured image. In some embodiments, the apparatus 102 may not include the camera 106, but may obtain image data, or a series of images or frames (e.g. a video stream) from an external source, such as a remote image acquisition system.

For the apparatus 102 to be able to present a guidance indicator 108 accurately at a correct position relative to the representation 110 of the user 100, the apparatus needs to know the position and orientation of the user accurately. In some embodiments, the apparatus 102 may use a face landmark detection (FLD) algorithm or engine to detect facial features or landmarks, such as corners of the user's eyes or mouth, edges of the user's nose or chin, or ends of a user's eyebrows, for example. Such features are considered to be standard or generic features of a human face. The FLD algorithm can identify such features and, if a sufficient number of the features are visible within a particular image acquired by the camera 106, then the orientation and the position of the face within the image may be determined.

When a particular landmark or feature of the user's face or head has been detected and identified by the FLD algorithm, a confidence value is determined and associated with that particular landmark. The confidence value provides an indication of how confident the FLD algorithm is in its determination of the position of the landmark. A confidence value may be relatively high if the positions of other nearby landmarks can also be determined. Conversely, if the positions of other nearby, or adjacent, landmarks cannot be determined, then the confidence value of the particular landmark may be relatively low. The position of a landmark may not be determinable if, for example, the user's face is turned, tilted or orientated such that the landmark is out of the field of view of the camera 106 capturing the images. Similarly, the position of a landmark may not be determinable if the landmark is obscured from view of the camera, for example by an object such a hand or a personal care appliance, positioned between the landmark and the camera 106.

The confidence values associated with the individual landmarks of the user's head may be used to determine an overall confidence value of the position of the head of the user 100. For example, the individual landmark confidence values may be combined to give a total confidence value in the position of the head. If the confidence value associated with the head is below a defined threshold, then the apparatus may conclude that position of the user's head cannot be determined accurately.

According to the invention, the guidance indicator 108 may be displayed only when each of one or more defined conditions are met. Specifically, the conditions may relate to the position of the head of the user 100. In other words, one or more conditions or criteria may be set (for example programmed into a processing apparatus associated with the apparatus 102), and the guidance indicator 108 is only displayed on the display 104 if all of the conditions or criteria are met. In some embodiments, the apparatus 102 may require that only one or more of the conditions (i.e. not all of the conditions) are met in order for the guidance indicator 108 to be displayed. Various conditions that might be set are discussed below with reference to FIGS. 3 to 7.

Figure 3:
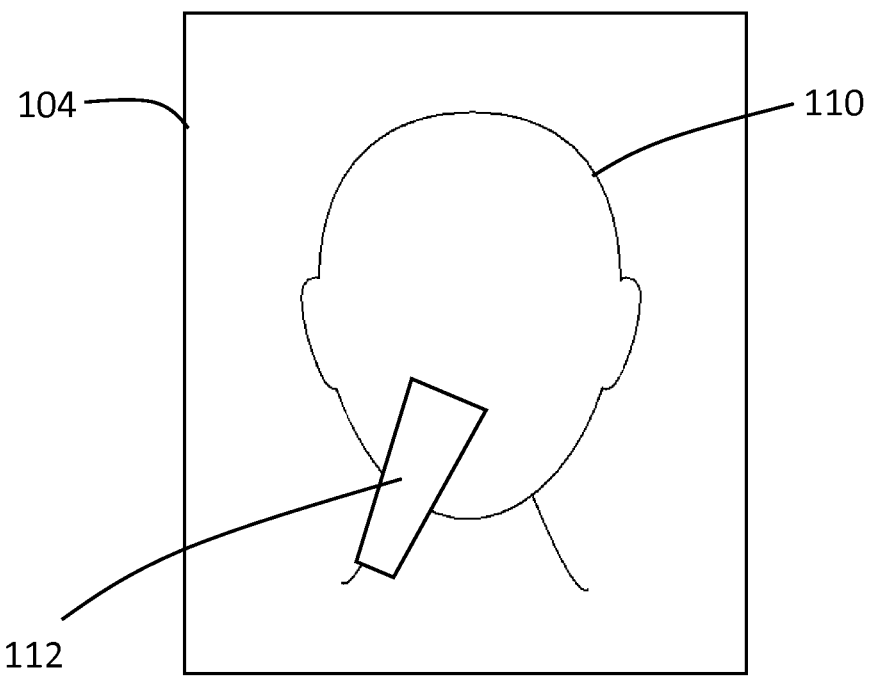
FIG. 3 is an illustration of an example of a representation of a user performing a personal care activity.

A first condition, or criterion, which, if applied, must be met in order for the apparatus 102 to display the guidance indicator 108 to the user 100 is that information relating to the position of the head must indicate that the position of the head of the user can be determined to a defined threshold level if accuracy. As noted above, the position of the head of the user 100 may not be determinable to a minimum level of confidence if some of the facial landmarks are not visible to the camera 106. FIG. 3 is an illustration of an example of an individual frame from a video stream (i.e. an individual image from a series of captured images) showing a user 100 performing a personal care activity which, in this case is trimming facial hair. In the example shown in FIG. 3, an example of a representation 110 of the user 100 is presented on the display 104. In this example, a hair cutting device 112, such as a trimmer or a shaver, is being used to trim facial hair of the user and is, therefore, obscuring part of the head of the user 100 from view by the camera 106. Since the hair cutting device 112 blocks some of the facial landmarks from the view of the camera 106, the apparatus 102 may not be able to determine their positions accurately and, therefore, may not be able to determine the position and orientation of the head to a high confidence level. If the apparatus 102 is unable to determine the precise position of the head, then it will not be able to position a guidance indicator 108 on the display accurately relative to the representation 110 of the head. Thus, to avoid the risk of presenting the guidance indicator 108 incorrectly with respect to the representation 110 of the head, the apparatus determines that the first condition is not met and, therefore, does not present the guidance indicator.

In some embodiments, the apparatus 102 will determine the confidence level associated with the determined position of the head, and compare the confidence level with a defined threshold. If the determined confidence level exceeds (i.e. is higher than) the threshold, then the apparatus 102 may consider that the condition is met. In other words, the position of the head is considered to be determined to a defined threshold level of accuracy when a confidence in the position of the head, or a confidence in positions of facial features of the head are above a defined confidence level.

Thus, some landmarks of the user's head may be obscured from view of the camera (e.g. by the hair cutting device 112 or by the user's hand), but the guidance indicator 108 may still be presented, because the position of the head can still be confidently determined.

Figure 4:
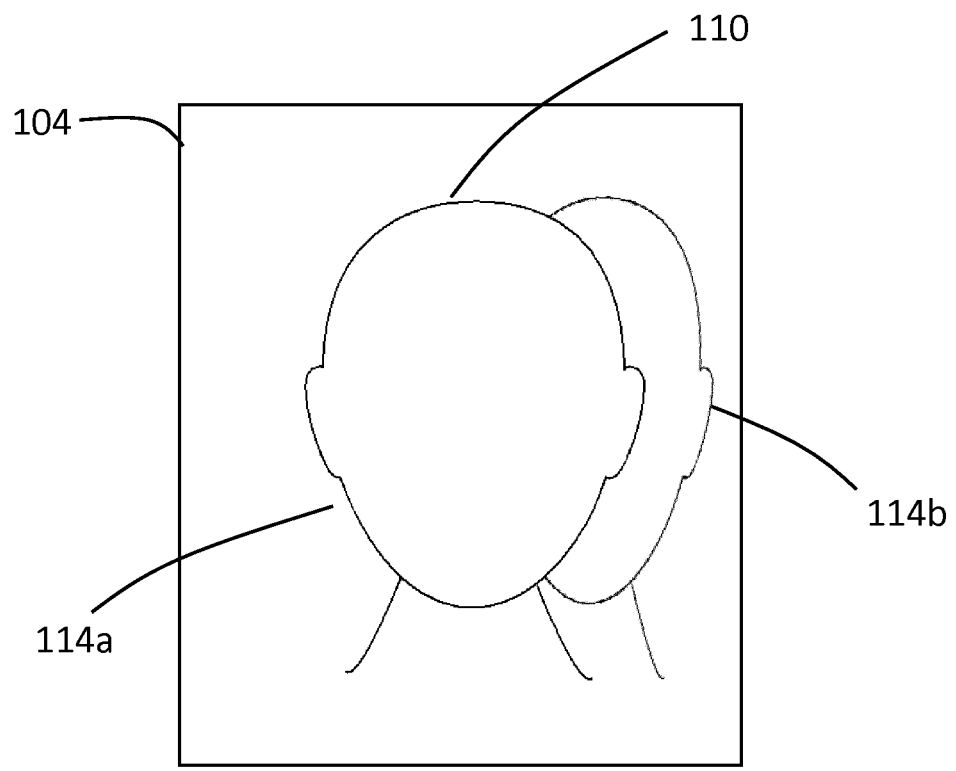
FIG. 4 is an illustration of a further example of a representation of a user performing a personal care activity.

A second condition or criterion which, if applied, must be met in order for the apparatus 102 to display the guidance indicator 108 to the user 100 is that information relating to the position of the head must indicate that a change in the position of the head over a defined period is less than a defined threshold. In other words, the user's head must not move too far and/or too rapidly in a defined period of time. In some embodiments, the defined period may comprise a time period (e.g. 0.5 seconds) while, in other embodiments, the defined period may comprise a period between capturing a first image and a second image in the series of images. Thus, the change in the position of the head may be measured between a first image and a second image in the series of images. An example of this condition is shown in FIG. 4. FIG. 4 shows, illustratively, a representation 110 of the head of the user 100 presented on the display 104. In this example, the representation 110 of the head has moved from a first position 114a to a second position 114b in a defined timed period, or between a first image and a second image of the series of images. For each image or frame captured by the camera 106 (or otherwise received by the apparatus 102 for processing), the position each landmark is recorded, for example in a storage medium associated with the apparatus. For example, for each image, a coordinate set may be determined for each visible landmark. By comparing the coordinates of each landmark in a plurality of successive images in the series of images, then the apparatus 102 can determine a measure of the motion of the user's head. For example, in some embodiments, the camera 106 may capture images at a rate of 20 frames per second (fps). The apparatus 102 may store three seconds of images (i.e. 60 images) in a memory for use in measuring the movement of the head.

The apparatus 102 may determine the movement of the head of the user 100 based on the movement of a single landmark or a set of landmarks, or based on the movement of a point in the image calculated, for example, from an average of the coordinates of the visible landmarks. When such an average coordinate value is calculated for a particular image, it may be compared to a reference coordinate value calculated from a preceding image in the series of images, or from an average reference coordinate value calculated from the images stored in the memory (e.g. an average from at least some of the previous 60 images). The second condition is considered to be met if the movement between the calculated coordinate value and the reference coordinate value is less than a defined threshold. In some embodiments, the defined threshold of the change in the position of the head between the first image and the second image may comprise a change of less than ten percent of a width or a height of the images. In other embodiments, the defined threshold may be a different percentage (e.g. 6%) of the height or width of the images.

As noted above, a set of images is stored in a memory associated with the apparatus 102. In some embodiments, the memory may be a first in, first out (FIFO) type memory, such that the latest set of images (e.g. the latest 60 frames) are stored. Each time the memory is updated with a new image, a new average reference coordinate value is calculated. In other embodiments, a rolling average is calculated, for example, by calculating a new average coordinate value each time a new frame is captured, and using the calculated average coordinate value as the reference value. In some embodiments, the positions of some landmarks may be weighted, for example based on the confidence value associated with the determined positions. Thus, positions known to a higher confidence level may be weighted more strongly thank positions known to a lower confidence level.

Figure 5:
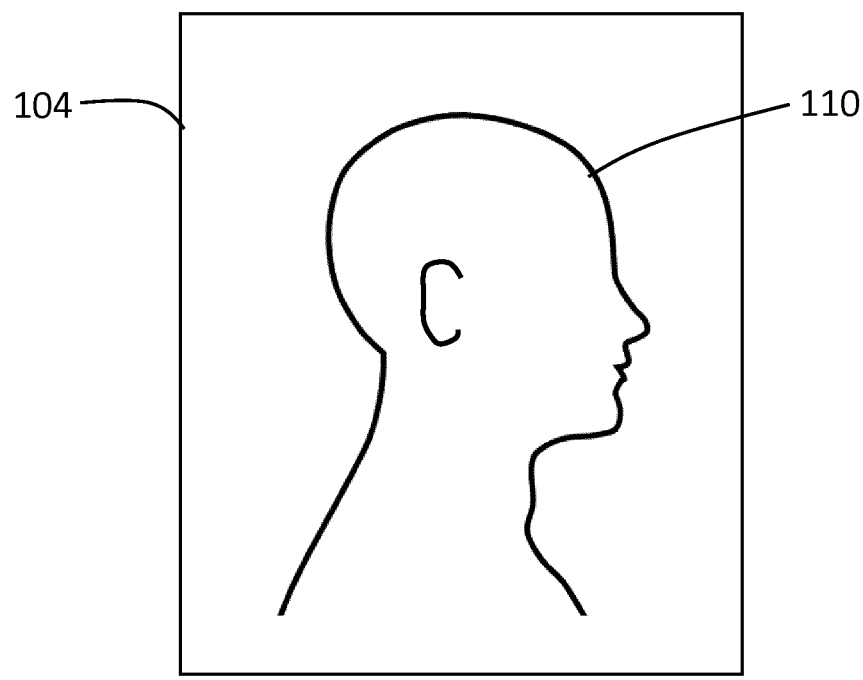
FIG. 5 is an illustration of a further example of a representation of a user performing a personal care activity.

A third condition or criterion which, if applied, must be met in order for the apparatus 102 to display the guidance indicator 108 to the user 100 is that the information relating to the position of the head must indicate that an orientation of the head relative to the display 104 is within a defined angular range. In other words, the user must be facing the display 104 or the head must be rotated or tilted (left or right, to vary the yaw; up or down, to vary the pitch) by less than a defined angle from the normal of the display. For example, the user's line-of-sight is considered to be a line extending straight forward from the user's face, as indicated, for example, in FIGS. 6 and 7, and the angle from the user's line of sight to the normal of the display may be calculated. In some embodiments, the defined angular range may be fifteen degrees while, in other embodiments, the defined angular range may be, five, ten or twenty degrees, for example. In general, the defined angular range may be less than 25 degrees from the normal. FIG. 5 shows a representation 110 of the head of the user 100 presented on the display 104. In this example, the head is rotated with respect to the display 104 (i.e. the user is not facing the display directly). In such an example, the camera 106 capturing images of the head of the user 100 may not be able to view all of the landmarks of the head and, therefore, the apparatus 102 may not be able to determine the positions of all of the landmarks or of the head accurately.

Figures 6A, 6B:
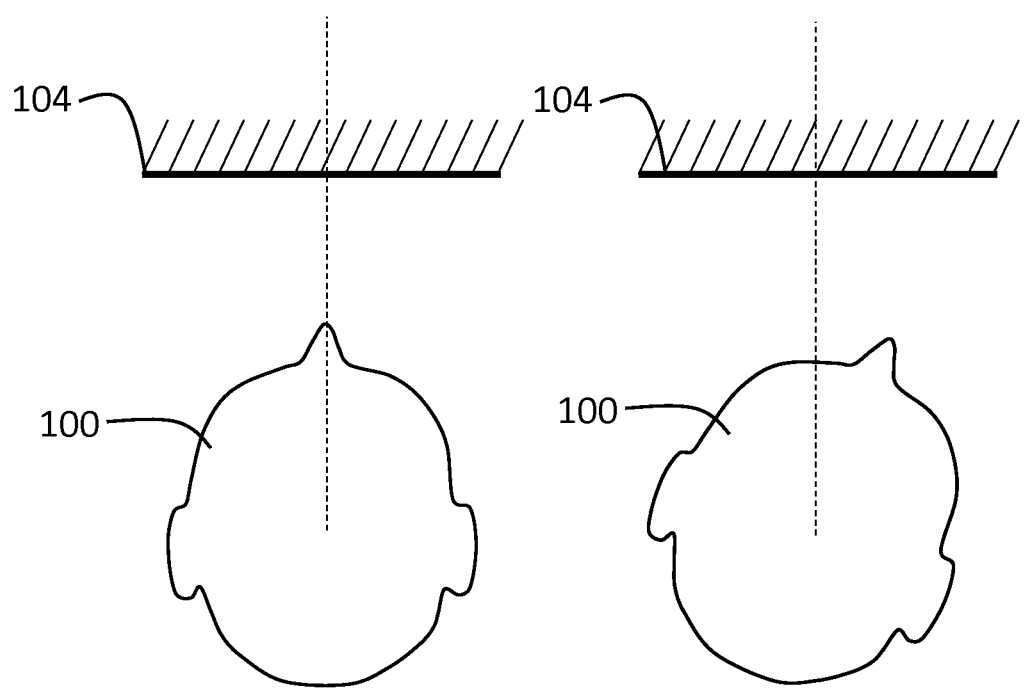
FIG. 6 is an illustration of a user performing a personal care activity.

FIG. 6 shows, illustratively, the head of the user 100 in two orientations relative to the display 104. In FIG. 6A, the head is facing the display 104, such that the user's line of sight is aligned with a normal of the display. The normal of the display is denoted with a dashed line in FIG. 6. In FIG. 6B, the head is rotated so that the user's line of sight is not aligned with the normal of the display.

As noted above, the third condition or criterion may be considered to be met if the apparatus determines that the line of sight of the user is within a defined angular range of the normal of the display 104. In some embodiments, the defined angular range may be 20, 15 or 10 degrees either side of the normal of the display.

Thus, the apparatus 102 may be programmed to display the guidance indicator 108 only if all conditions in a set of defined conditions are met. One or more of the three conditions described above may be applied to the apparatus.

While, in some embodiments, displaying the guidance indicator 108 may comprise simply making the indicator appear on the display 104 suddenly, in other embodiments, the appearance of the guidance indicator may be more gradual. For example in some embodiments, when the information relating to the position of the head indicates that all of the defined conditions are met, the guidance indicator 108 may be caused to gradually appear. Similarly, while the guidance indicator 108 is being displayed on the display 104, the guidance indicator may be caused to gradually disappear if the information relating to the position of the head indicates that any one of the defined conditions is not met.

The gradual appearance/disappearance of the guidance indicator 108 is explained with reference to an example shown in FIG. 7. The example of FIG. 7 refers to the user rotating his or her head left or right with respect to the display (i.e. yaw movements). The same principle applies for tilting movements of the head up and down with respect to the display (i.e. pitch movements) and rotations about an axis along the line of sight (i.e. roll movements).

Figures 7A, 7B, 7C:
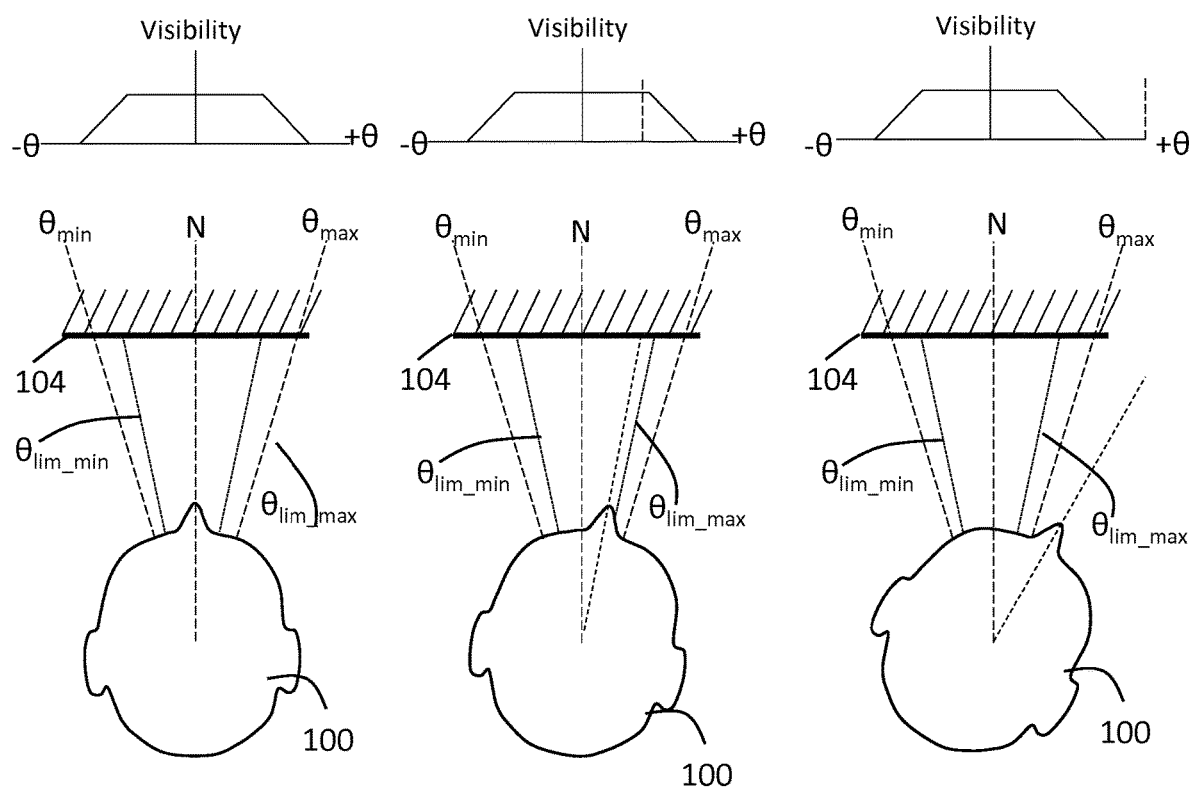
FIG. 7 is an illustration of a user's head in three different orientations with respect to a display.

In FIG. 7A, the head of the user 100 is oriented such that the user's line of sight is aligned with the normal (labelled N in FIG. 7) of the display 104. Dashed lines $\theta_{min}$ and $\theta_{max}$ represent, respectively, the minimum and maximum angles through which the head of the user 100 can rotate while satisfying the third condition discussed above. In other words, while the user's face is oriented within the angular range $\theta_{min}$ to $\theta_{max}$, the third condition is met, and the guidance indicator 108 is displayed. Dotted lines $\theta_{lim\_min}$ and $\theta_{lim\_max}$ represent the angles at which the guidance indicator 108 will start to disappear as the head rotates towards $\theta_{min}$ and $\theta_{max}$ respectively, or start to appear if the head rotates from $\theta_{min}$ towards $\theta_{lim\_min}$ or from $\theta_{max}$ towards $\theta_{lim\_max}$.

In FIG. 7B, the user's head has rotated towards $\theta_{max}$, but is within the angular range $\theta_{min}$ to $\theta_{max}$, so the guidance indicator 108 is displayed. Moreover, the orientation of the head is such that the rotation of the head is within the angular range $\theta_{lim\_min}$ to $\theta_{lim\_max}$, so the guidance indicator 108 is displayed with maximum visibility, and has not started to disappear. The visibility of the guidance indicator is represented in the graphs above the displays in FIGS. 7A, 7B and 7C.

In FIG. 7C, the user's head has rotated further than in FIG. 7B and, in this case, is rotated beyond the angular range $\theta_{min}$ to $\theta_{max}$. Therefore, the guidance indicator 108 has gradually disappeared and will not be visible to the user 100.

If the user's head is rotate to an angle between $\theta_{lim\_max}$ and $\theta_{max}$, then the guidance indicator 108 would be partially visible to the user, during its transition from fully visible to not visible. Thus, the visibility of the guidance indicator 108 decreases as a function of a level of deviation of the position of the head from the defined conditions. In some embodiments the guidance indicator 108 may fade as it gradually disappears.

In a manner similar to the appearance of the guidance indicator 108, as the head of the user 100 rotates from $\theta_{max}$ to $\theta_{lin\_max}$ (or from $\theta_{min}$, to $\theta_{lim\_min}$), the guidance indicator 108 may be caused to gradually appear.

The example shown in FIG. 7 relates to the third condition discussed above. However, the gradual appearance and disappearance of the guidance indicator 108 may be caused as the head approaches or deviates from a position which satisfies other conditions. For example, as a user 100 moves a hair cutting device 112 over his or her face, and the confidence in the position of the head of the user decreases, the visibility of the guidance indicator 108 may decrease (as in first condition discussed above). Similarly, the visibility of the guidance indicator 108 may decrease as the speed of movement of a user's head increases to a threshold level (as in second condition discussed above).

Thus, a degree of visibility of the guidance indicator 108 may vary as a function of the closeness of the position of the head to meeting the defined conditions. In this way, the user 100 can see easily whether the conditions are met (in which case the guidance indicator 108 will be fully visible), not met (in which case the guidance indicator 108 will not be visible), or nearly met (in which case the guidance indicator 108 will partially visible, for example in a faded state), By gradually adjusting the visibility of the guidance indicator 108, rather than simply causing the indicator to appear or disappear, the user 100 may gain an understanding of which of his or her actions has led to the change in visibility. For example, if the user rotates his or her head to an extent which causes the guidance indicator 108 to start to disappear, the user may intuitively rotate their head back in order to cause the indicator to become fully visible. Thus, by varying the visibility of the guidance indicator as a function of the level of deviation from the defined conditions being met, the user is provided with feedback regarding his position relative to the display.

Figure 8:
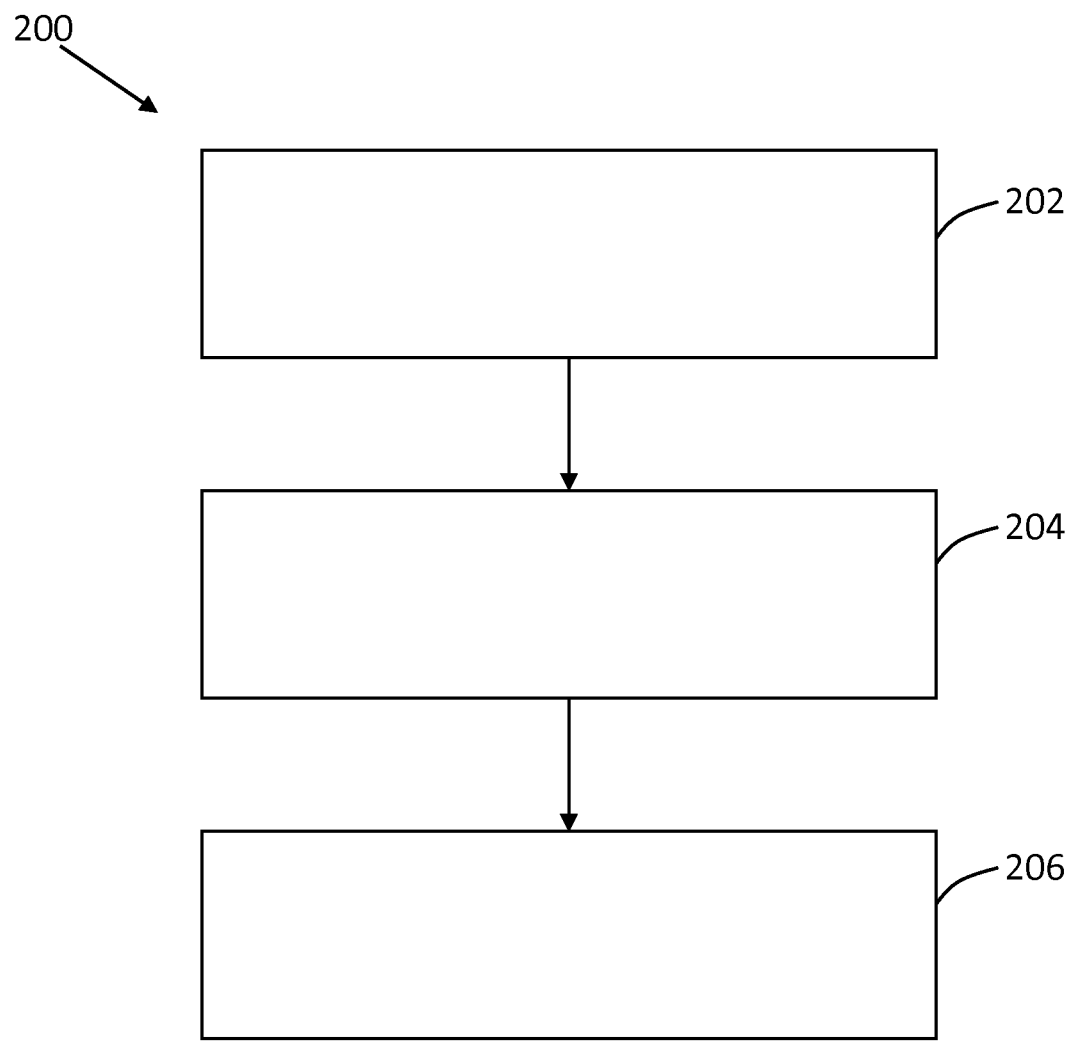
FIG. 8 is a flowchart of an example of a method of displaying a guidance indicator to a user.

FIG. 8 is a flowchart showing an example of a method 200 of displaying a guidance indicator 108 to a user 100. The method 200 comprises, at 202, receiving a series of images of a head of a user 100. The series of images may comprise frames of a video stream, and may be received from a remote source, such as an external camera, or may be captured by a camera 106 connected to or associated with an apparatus 102 performing the method. The method also comprises, at 204, determining, from each image of the series of images, information relating to the position of the head of the user 100. The determining at 204 may be performed by a processing apparatus associated with the apparatus 102. At 206, the method 200 comprises displaying to the user, on a screen of the display 104, a guidance indicator 108 associated with a representation of the head of the user 100 only if each of one or more defined conditions regarding the position of the head is met. The conditions may include one or more of the three conditions discussed above. For example, the defined conditions regarding the position of the head may comprise one or more of the following: i) the information relating to the position of the head indicates that the position of the head can be determined to a defined threshold level of accuracy; ii) the information relating to the position of the head indicates that a change in the position of the head over a defined period is less than a defined threshold; and iii) the information relating to the position of the head indicates that an orientation of the head relative to the display screen is within a defined angular range. In some embodiments, the processing apparatus may determine whether or not the conditions are met based on the information relating to the position of the head of the user 100. In some embodiments, the guidance indicator 108 may be displayed to the user only if all of the defined conditions (e.g the first, second and third conditions discussed above) regarding the position of the head are met while, in other embodiments, the guidance indicator 108 may be displayed to the user if only one (e.g. the first) condition is met.

Figure 9:
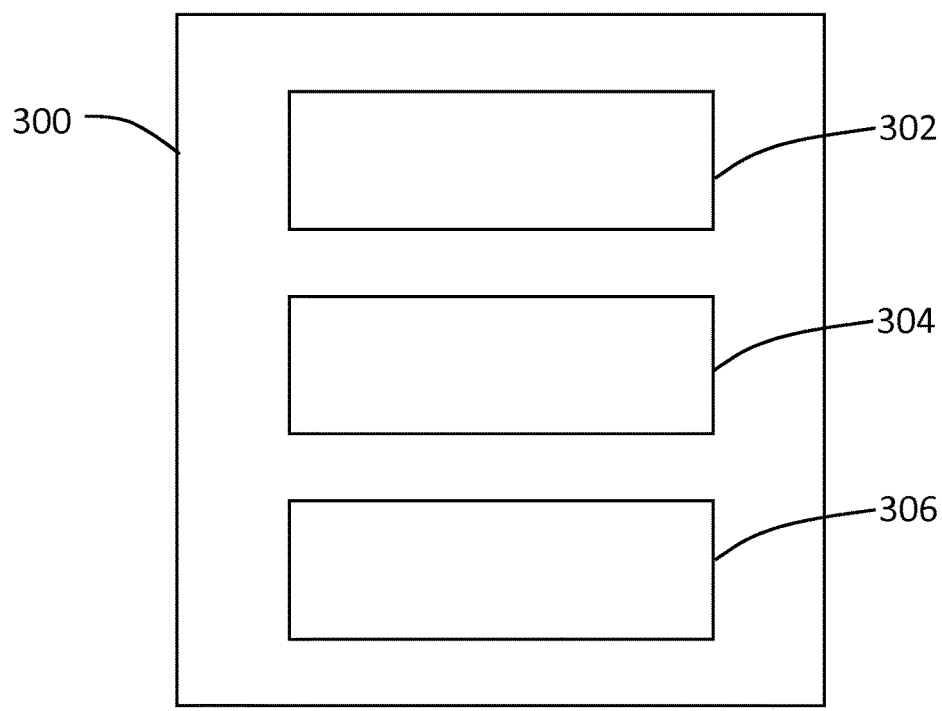
FIG. 9 is a schematic of an example of an apparatus for providing guidance to a user.

The invention also provides an apparatus for providing guidance to a user, and which may be used to perform the method 200. FIG. 9 shows, schematically, an example of such an apparatus 300. The apparatus 300, which may be the apparatus 102 discussed above, comprises an imaging unit 302 for receiving a series of images of a head of a user 100. The apparatus 300 also comprises a processing unit 304 for determining, from each image of the series of images, information relating to the position of the head of the user 100. The apparatus 300 also comprises a display screen 306, such as the display 104. The processing unit 304 is configured to display, on the display screen 306, a guidance indicator 108 associated with a representation of the head of the user 100 only if each of one or more defined conditions regarding the position of the head is met. For example, the defined conditions regarding the position of the head may comprise one or more of the following: i) the information relating to the position of the head indicates that the position of the head can be determined to a defined threshold level of accuracy; ii) the information relating to the position of the head indicates that a change in the position of the head over a defined period is less than a defined threshold; and iii) the information relating to the position of the head indicates that an orientation of the head relative to the display screen is within a defined angular range.

Figure 10:
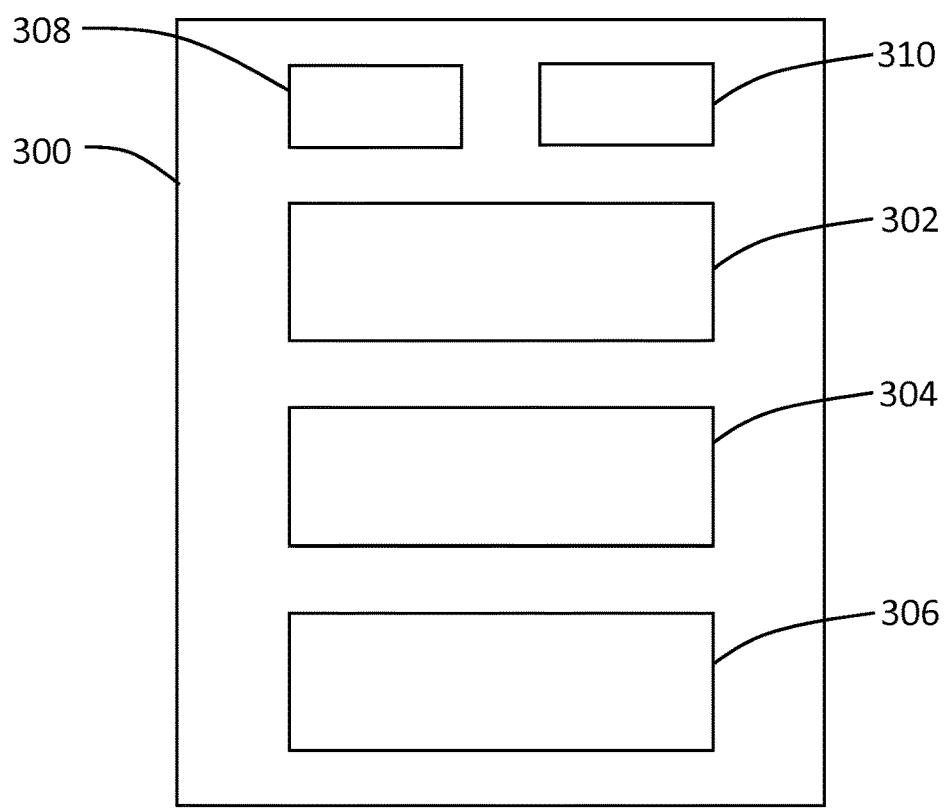
FIG. 10 is a schematic of a further example or an apparatus for providing guidance to a user.

An alternative embodiment of the apparatus 300 is shown in FIG. 10. In FIG. 10, the apparatus 300 is similar to the apparatus of FIG. 9, but further includes a camera 308 for capturing the series of images of the head of the user. The camera 308 may be the same as the camera 106 discussed above. The apparatus 300 may also include a storage medium 310 for storing at least one of: the received series of images and the determined information relating to the position of the head of the user 100.

The apparatus 300 may comprises one of: a smart TV, a smart mirror, a smart phone, a tablet computer, a laptop computer and a desktop computer.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method of displaying a guidance indicator to a user, the method comprising:
   receiving a series of images of a head of a user;
   determining, from each image of the series of images, information relating to a position of the head of the user; and
   displaying to the user, on a display screen, a guidance indicator associated with a representation of the head of the user only when each of one or more defined conditions regarding the position of the head is met, such that the user is provided with an indication that they are positioned suitably for the position of the head to be determined, wherein the defined conditions regarding the position of the head comprise one or more of the following:
   i) the information relating to the position of the head indicated that a change in the position of the head over a defined period is less than a defined threshold; and
   ii) the information relating to the position of the head indicated the head is rotated or tilted about an axis parallel to the display screen by less than a defined angular range from a normal to the display screen.

2. The method according to claim 1, wherein the guidance indicator is displayed when, in addition to the one or more defined conditions, the information relating to the position of the head indicates that the position of the head can be determined to a defined threshold level of accuracy.

3. The method according to claim 2, wherein the position of the head is considered to be determined to a defined threshold level of accuracy when a confidence in the position of the head, or a confidence in positions of facial features of the head are above a defined confidence level.

4. The method according to claim 1, wherein said defined threshold of the change in the position of the head over the defined period comprises less than ten percent of a width or a height of the images.

5. The method according to claim 1, wherein the defined angular range comprises fifteen degrees from a normal to the display screen.

6. The method according to claim 1, wherein the series of images are received via a camera associated with the display screen.

7. The method according to claim 1, wherein the guidance indicator comprises at least one of: a line, text or an image for assisting the user with a personal care activity.

8. The method according to claim 1, wherein displaying the guidance indicator comprises causing a gradual appearance of the guidance indicator when the information relating to the position of the head indicates that all of the defined conditions are met.

9. The method according to claim 8, wherein a degree of visibility of the guidance indicator varies as a function of a closeness of the position of the head to meeting the defined conditions.

10. The method according to claim 1, further comprising:
    while the guidance indicator is being displayed on the display screen, causing the guidance indicator to gradually disappear when the information relating to the position of the head indicates that any one of the defined conditions is no longer met.

11. The method according to claim 10, wherein visibility of the guidance indicator decreases as a function of a level of deviation of the position of the head from the defined conditions.

12. An apparatus for providing guidance to a user, the apparatus comprising:
    an imaging unit for receiving a series of images of a head of a user;
    a processing unit for determining, from each image of the series of images, information relating to a position of the head of the user; and
    a display screen, wherein the processing unit is configured to display, on the display screen, a guidance indicator associated with a representation of the head of the user only when each of one or more defined conditions regarding the position of the head is met, such that the user is provided with an indication that they are positioned suitably for the position of the head to be determined, wherein the defined conditions regarding the position of the head comprise one or more of the following:
    i) the information relating to the position of the head indicated that a change in the position of the head over a defined period is less than a defined threshold; and
    ii) the information relating to the position of the head indicated the head is rotated or tilted about an axis parallel to the display screen by less than a defined angular range from a normal to the display screen.

13. The apparatus according to claim 12, further comprising:
    a camera for capturing the series of images of the head of the user.

14. The apparatus according to claim 12, wherein the position of the head is considered to be determined to a defined threshold level of accuracy when a confidence in the position of the head, or a confidence in positions of facial features of the head are above a defined confidence level.

15. The apparatus according to claim 12, wherein the apparatus comprises one of: a smart TV, a smart mirror, a smart phone, a tablet computer, a laptop computer and a desktop computer.

16. The method according to claim 1, wherein the guidance indicator is displayed when, in addition to said one or more defined conditions, the information relating to the position of the head indicates that the position of the head can be determined to a defined threshold level of accuracy.

17. The apparatus according to claim 14, further comprising:
   a storage medium for storing at least one of: the received series of images; and the determined information relating to the position of the head of the user.

18. The apparatus according to claim 14, wherein said defined threshold of the change in the position of the head over the defined period comprises less than ten percent of a width or a height of the images.

\* \* \* \* \*